UNITED STATES PATENT OFFICE.

WHITNEY B. JONES, OF NEWARK, NEW JERSEY, ASSIGNOR TO BUTTERWORTH-JUDSON CORPORATION, OF NEW YORK, N. Y., A CORPORATION OF NEW YORK.

PROCESS OF MAKING NITRODIAZO COMPOUNDS.

1,394,556.    Specification of Letters Patent.    Patented Oct. 25, 1921.

No Drawing.    Application filed March 6, 1920.    Serial No. 363,759.

*To all whom it may concern:*

Be it known that I, WHITNEY B. JONES, a citizen of the United States, residing at Newark, in the county of Essex and State of New Jersey, have invented certain new and useful Improvements in Processes of Making Nitrodiazo Compounds, of which the following is a specification.

It is known that nitro-diazo compounds capable, by coupling with beta-naphthol, of yielding nitro-azo dyestuffs, may be prepared by subjecting 1-diazo-2-oxy-naphthalene-4-sulfonic acid to nitration, as described for example in U. S. Patent 790,363, patented May 23, 1905, to Hagenbach. In the practice of that process, however, the yields are relatively small, and moreover difficulties are encountered in the practical performance of the operation.

I have discovered that a much smoother operation, attended by superior yields, is attained if instead of the free acid, the corresponding metal salts are subjected to the nitrating operation. For this purpose I prefer to use the zinc salt, which may be represented as follows:

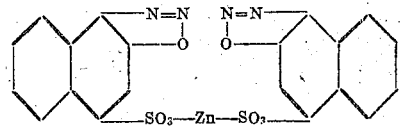

I have employed the corresponding copper and iron salts, with inferior results as compared with the zinc salt, although with superior yields as compared with the free acid heretofore used. In addition to the improved yields, the use of the metallic salts as described herein offers the advantage that the final filtration is rendered commercially practicable.

A preferred example in accordance with my invention is as follows:—

562 pounds of the zinc salt of 1-diazo-2-oxy-naphthalene-4-sulfonic acid in dried finely powdered condition, are added slowly to 1687 pounds of monohydrate sulfuric acid, keeping the temperature below 5° C. When solution is complete 679 pounds of mixed acid, composed of 30% nitric and 68% sulfuric acids, are slowly run in, keeping the temperature between 0–5° C. The mass is stirred for several hours after all of the acid has been added, and is then run slowly into sufficient ice to produce a final dilution of about 30% $H_2SO_4$. The ice cold mass is then filtered, and the resulting paste of nitro compound is used direct in the manufacture of the dyestuff, for example by coupling with beta-naphthol in the known manner.

My invention is of course not limited to the details of procedure and manipulation as described in the above specific example.

I claim:

1. Process of making a nitro-diazo compound, comprising nitrating a metallic salt of 1-diazo-2-oxy-napthalene-4-sulfonic acid.

2. Process of making a nitro-diazo compound, comprising nitrating a zinc salt of 1-diazo-2-oxy-naphthalene-4-sulfonic acid.

In testimony whereof I affix my signature.

WHITNEY B. JONES.